US007093123B1

(12) United States Patent
Hiruma et al.

(10) Patent No.: US 7,093,123 B1
(45) Date of Patent: Aug. 15, 2006

(54) INFORMATION PROCESSING METHOD AND INFORMATION PROCESSING SYSTEM

(75) Inventors: Teruo Hiruma, Hamamatsu (JP); Tsutomu Hara, Hamamatsu (JP); Haruyoshi Toyoda, Hamamatsu (JP); Yasunori Igasaki, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 818 days.

(21) Appl. No.: 10/088,631

(22) PCT Filed: Sep. 20, 2000

(86) PCT No.: PCT/JP00/06441

§ 371 (c)(1), (2), (4) Date: Mar. 20, 2002

(87) PCT Pub. No.: WO01/22190

PCT Pub. Date: Mar. 29, 2001

(30) Foreign Application Priority Data

Sep. 21, 1999 (JP) ............................... P11-267070

(51) Int. Cl.
*G06F 11/30* (2006.01)

(52) U.S. Cl. ....................... 713/161; 713/168; 713/189

(58) Field of Classification Search ................ 713/161, 713/168, 189, 200, 201
See application file for complete search history.

(56) References Cited

U.S. PATENT DOCUMENTS

| | | | | |
|---|---|---|---|---|
| 5,367,579 | A | 11/1994 | Javidi et al. | 382/31 |
| 6,629,097 | B1 * | 9/2003 | Keith | 707/5 |

FOREIGN PATENT DOCUMENTS

| | | |
|---|---|---|
| JP | 10-123919 | 5/1998 |
| JP | 11-110975 | 4/1999 |

* cited by examiner

*Primary Examiner*—Thomas R. Peeso
(74) *Attorney, Agent, or Firm*—Drinker Biddle & Reath LLP

(57) ABSTRACT

Predetermined hologram images 7_a_, 7_b_ formed by three-dimensionally arranging a plurality of data items constituting data group information are read out from hologram devices 6_a_, 6_b_, and an image correlation calculation between the hologram images 7_a_, 7_b_ is carried out by a Fourier transform optical system constituted by Fourier transform lenses 8, 13 and an optical address type SLM 9, whereby a correlation value of data groups is detected by a photodetector 14.

6 Claims, 4 Drawing Sheets

INFORMATION PROCESSING METHOD AND INFORMATION PROCESSING SYSTEM

TECHNICAL FIELD

The present invention relates to an information processing system which processes data of a data group comprising a plurality of information items in parallel; and, in particular, to an information processing method and information processing system which carry out data processing between group information items of data groups each including a number of information items.

BACKGROUND ART

In the present age known as information-oriented society, various kinds of data are stored, and a variety of databases are constructed. Such databases are meaningless if they are simply stored. The added value and utility value of databases will increase if data groups constituting the stored database can freely be retrieved and subjected to information processing therebetween.

Conventionally, such data have been stored in memory devices of computers, and necessary information has been readout electrically and subjected to arithmetic processing, so as to carry out information processing.

DISCLOSURE OF THE INVENTION

In the case where information processing is to be carried out between data groups each comprising a number of data items when processing information of such a database, arithmetic operations are necessary between individual data items constituting a data group or in the whole data group. It has been common for conventional electronic information processing apparatus to carryout these arithmetic operations as occasion arises, or a number of arithmetic processing circuits are provided so as to carry out the arithmetic operations in parallel.

In the former case, even when a high-speed arithmetic processing circuit is utilized, the arithmetic processing time dramatically increases if the number of processing data items becomes enormous, which makes it difficult to raise the information processing speed. On the other hand, the latter case is problematic in that the number of circuits becomes enormous, thereby raising the cost of the apparatus. Also, it is inefficient when the number of data items constituting the data groups is small.

Therefore, in view of the problems mentioned above, it is an object of the present invention to provide an information processing method and information processing system which can efficiently carry out information processing between data groups each having a number of data items at a high speed.

For overcoming the above-mentioned problems, the information processing method in accordance with the present invention comprises the step of carrying out parallel information processing between a plurality of information groups each comprising a plurality of information items; wherein a plurality of data items constituting data group information are arranged three-dimensionally; and wherein a data correlation calculation between a plurality of thus arranged information groups is carried out by utilizing an arrangement characteristic.

On the other hand, the information processing system in accordance with the present invention is an information processing system for processing information between a plurality of information groups each comprising a plurality of information items in parallel; the system comprising arranging means for three-dimensionally arranging a plurality of data items constituting data group information into a predetermined form, and arithmetic means for carrying out a data correlation calculation between a plurality of information groups arranged by the arranging means.

According to the present invention, a data group comprising a number of data items is expressed as a predetermined virtual three-dimensional image. The data correlation calculation can be carried out easily at a high speed by utilizing a characteristic of the three-dimensional image.

Preferably, each data group information is arranged as a hologram image, and an image correlation calculation is carried out between hologram images. As a consequence, an information group comprising a plurality of information items is expressed as a single hologram image. When a data correlation calculation is performed between the holograph images, the arithmetic operation between information groups having a large amount of data can be carried out efficiently at a high speed. The hologram image may be either projected as an optical hologram image or held in a memory within a computer.

Preferably, the arithmetic means projects a hologram image representing each data group, and optically carries out an image correlation calculation.

Carrying out an optical image correlation calculation makes it unnecessary to construct arithmetic devices by a number corresponding to the number of pixels as in an electronic parallel arithmetic processing system, whereby information of data groups including a number of information items can be processed effectively with a small amount of resources without requiring enormous hardware and software resources even when the amount of data is very large.

Preferably, hologram image preparing means for forming a predetermined hologram image is further provided. This is favorable in that information processing of data groups becomes easier.

BEST MODES FOR CARRYING OUT THE INVENTION

Figure 1:
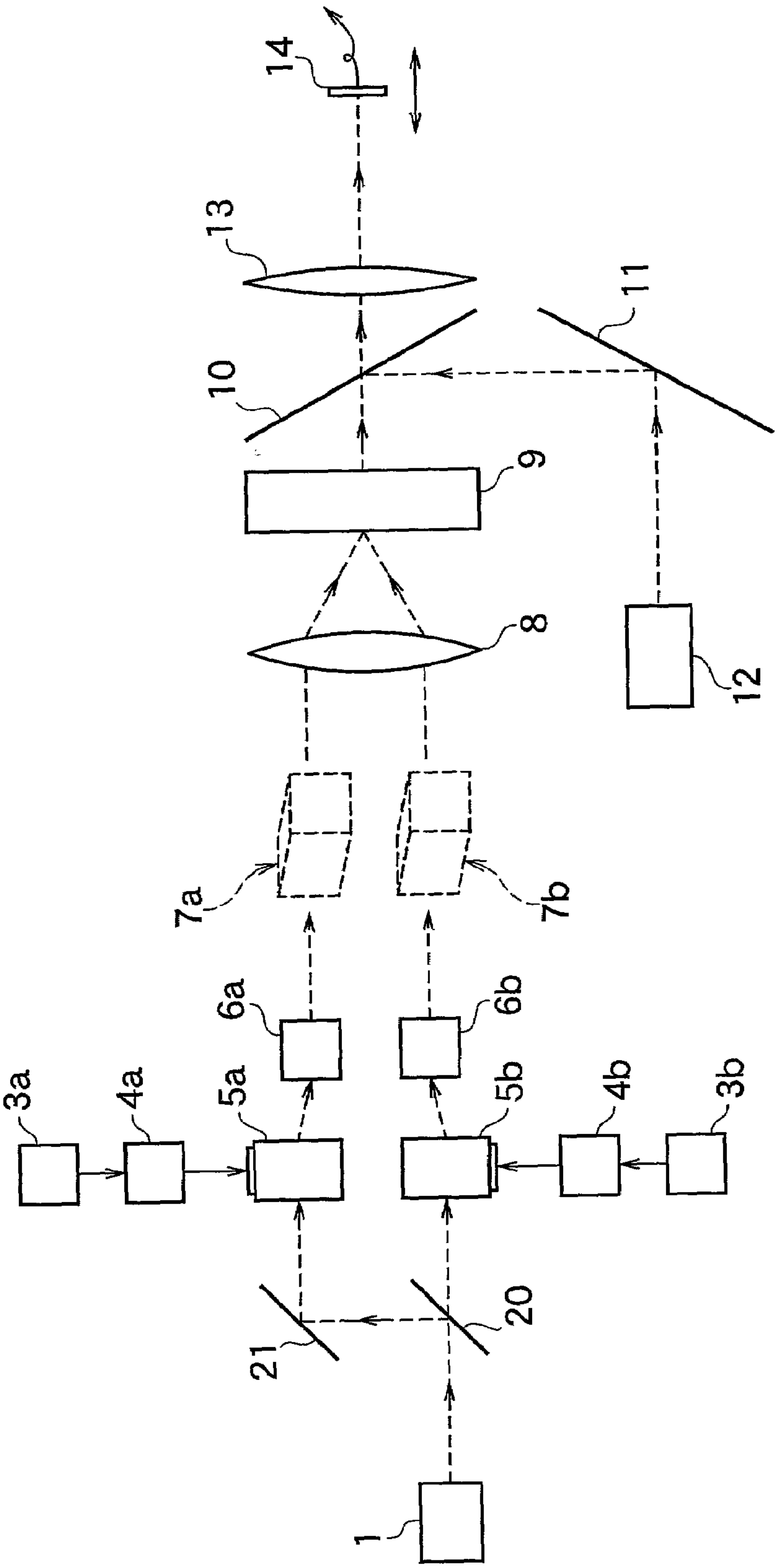
FIG. 1 is a diagram showing a first embodiment of the information processing system in accordance with the present invention as a whole.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is a schematic diagram of the information processing system in accordance with the present invention. This system is one which projects hologram images 7*a*, 7*b*, each representing a data group, and optically carries out a correlation calculation between the two images; and is configured as will be explained in the following.

This system is roughly divided into a projection system for projecting hologram images, and an arithmetic processing system for carrying out an image correlation calculation between the projected hologram images.

First, the projection system has hologram devices 6$a$, 6$b$ in which the hologram images 7$a$, 7$b$ are recorded. The hologram devices 6$a$, 6$b$ are configured such that laser beams split by a splitter 20 and a mirror 21 after being emitted from a laser light source 1 are made incident thereon, whereas acoustooptical cells 5$a$, 5$b$, each made of a single crystal of tellurium dioxide, for example, are arranged on the respective incident optical paths of the laser light beams. Connected to the respective acoustooptical cells 5$a$, 5$b$ are voltage-controlled oscillators (VCOs) 4$a$, 4$b$ for generating a high-frequency voltage for controlling their operations, whereas control voltage generating circuits 3$a$, 3$b$ are connected to the VCOs 4$a$, 4$b$, respectively.

The arithmetic processing system has a Fourier transform lens 8 into which the hologram images 7$a$, 7$b$ are introduced, and a spatial light modulator (SLM) 9 of optical address type having a writing light entrance surface arranged at a focal position of the lens 8, whereas a half mirror 10 is disposed on the reading light entrance surface side of the SLM 9, whereby the reading light emitted from a laser light source 12 is guided to the reading light entrance surface of the SLM 9 by way of a mirror 11 and the half mirror 10. A Fourier transform lens 13 is arranged on an extension of the path from the SLM 9 to the half mirror 10, whereas a photodetector 14 is disposed at a focal position of the lens 13.

Figure 2:
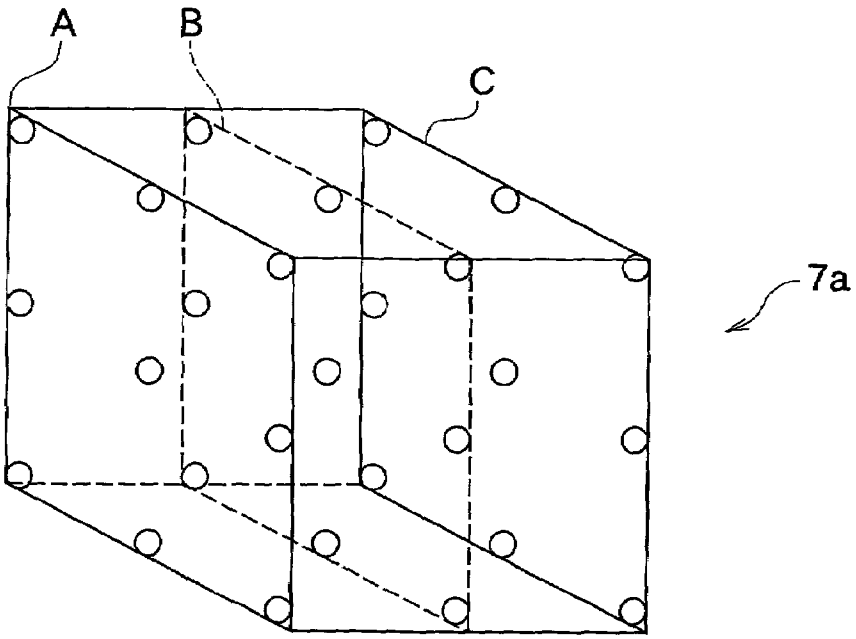
FIG. 2 is a view for explaining a hologram image representing a data group used in the apparatus of FIG. 1.

A hologram image used in this system will now be explained. FIG. 2 is a perspective view of the hologram image 7$a$ (the same as 7$b$). For simplification, the case where a data group composed of 3×3×3=27 items of data is turned into a hologram image will be explained here by way of example.

As shown in FIG. 2, each data group is represented by arranging lattice points by 3×3×3 on a space, assigning data items to the lattice points one by one, and displaying standardized data values as brightness, concentration, and phase (refractive index difference). In the following, three planes each formed by nine lattice points will be referred to as planes A, B, and C in succession from the left side of the drawing.

Figure 3:
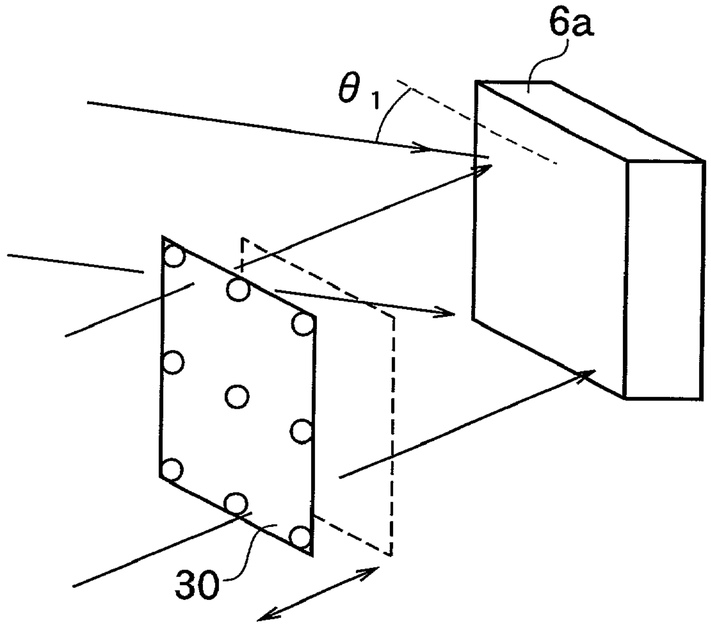
FIGS. 3 and 4 are views for explaining the recording and reproducing of the hologram image of FIG. 2.
Figure 4:
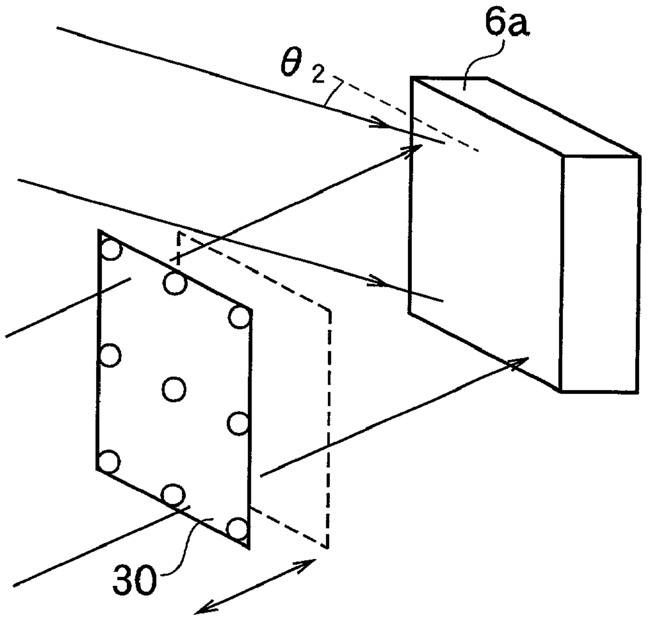

The recording and reproducing of the hologram images with respect to the hologram devices 6$a$, 6$b$ will be explained with reference to FIGS. 3 and 4. First, for recording a hologram image, an image of a predetermined plane, such as plane A, in a hologram image to be recorded, is displayed on an SLM 30, and thus displayed image is read out with a laser beam, so as to irradiate the hologram device 6$a$. On the other hand, the crystal plane is irradiated with another laser beam acting as reference light by an angle of $\theta_1$, whereby an image of the projected plane A is recorded within the crystal. While the SLM 30 is moved in the direction of optical axis of reading laser beam, the displaying image is successively switched to images of planes B and C, whereby a predetermined hologram can be recorded within the hologram device 6$a$. Further, with the angle of reference light being changed to $\theta_2$, similar recording may be carried out, whereby another hologram image can be recorded. In the case of 1 $cm^3$ of a single crystal of lithium niobate, about 5000 planar images can be recorded.

When reproducing the recorded information, reproducing light is made incident on the crystal at the angle of $\theta_1$. As a consequence, the hologram image written with the reference light at the angle of $\theta_1$ is read out and projected.

Explanations will now be provided for operations of this system as a whole, i.e., the information processing method in accordance with the present invention. First, a number of data items are standardized, each data item is expressed by brightness, luminance, and the like, and hologram devices 6$a$, 6$b$ each arranging the data items spatially, i.e., three-dimensionally, so as to record them as a hologram image are prepared. Recorded in the hologram devices 6$a$, 6$b$ are respective hologram images 7$a$, 7$b$ representing data groups different from each other.

Laser light emitted from the light source 1 is split into two by the beam splitter 20, one of thus obtained two laser beams is directly introduced to the acoustooptical cell 5$b$, whereas the other is reflected by the mirror 21 so as to be guided to the acoustooptical cell 5$a$. To the respective transducers of the acoustooptical cells 5$a$, 5$b$, high-frequency voltages are applied from their corresponding VCOs 4$a$, 4$b$. The frequencies of the high-frequency voltages can be changed by adjusting the control voltages applied to the VCOs 4$a$, 4$b$ from the control voltage generating circuits 3$a$, 3$b$. Within the acoustooptical cells 5$a$, 5$b$, ultrasonic waves are propagated by the high-frequency voltages applied to their transducers, and thus propagating ultrasonic waves function as gratings for the incident laser light, whereby light is diffracted by angles corresponding to the spatial frequencies of the gratings. When the hologram devices 6$a$, 6$b$ are thus irradiated with laser light having a predetermined angle as reading light, predetermined hologram images 7$a$, 7$b$ are projected.

The read-out hologram images 7$a$, 7$b$ are optically subjected to joint Fourier transform by the Fourier transform lens 8, whereby a joint Fourier transform image is formed on the writing surface of the SLM 9. The laser beam is made incident on the reading light entrance surface of the SLM 9 from the laser light source 12 by way of the mirror 11 and half mirror 10, so as to readout this image. Thus read-out image is subjected to Fourier transform again by the Fourier transform lens 13, whereby a correlation value between the object image and a reference image can be obtained by the photodetector 14. At that time, results of arithmetic operations between predetermined planes of the hologram images 7$a$, 7$b$ are obtained when the photodetector 14 is moved in the optical axis direction.

The high-frequency voltages applied to the acoustooptical cells 5$a$, 5$b$ can have a frequency of 100 MHz or higher. In this case, about 1000 images can sequentially be read out per second from the hologram devices 6$a$, 6$b$. When an SLM having a response speed of 1 millisecond is used as the SLM 9 for arithmetic operations, a correlation calculation can be carried out by a unit of milliseconds between hologram images each having 1000×1000×1000 pixels with each pixel being displayed by an 8-bit (256-gradation) grayscale.

Figure 5:
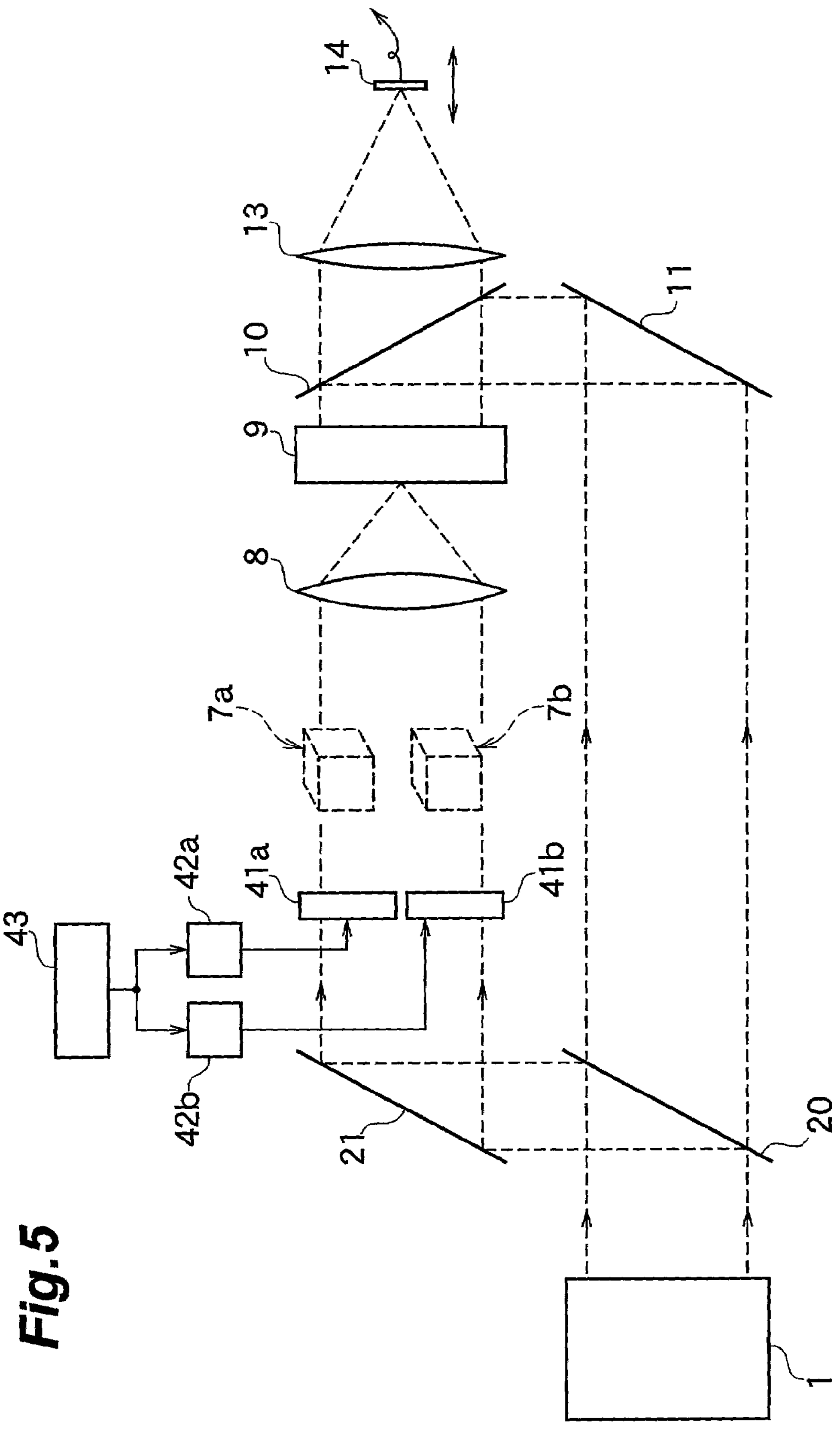
FIG. 5 is a diagram showing a second embodiment of the information processing system in accordance with the present invention as a whole.

FIG. 5 is a schematic diagram showing a second embodiment of the information processing system in accordance with the present invention. This apparatus has a configuration different from that of the first embodiment shown in FIG. 1 in the projection system for hologram images. In this apparatus, hologram images are determined by a computer 43 from calculations according to each data item of data groups, thus determined images are stored in their corresponding memories 42$a$, 42$b$, and thus stored images are displayed in spatial light modulators 41$a$, 41$b$ of electric address type, whereby the hologram images are projected.

This system can carry out a correlation calculation between images at a high speed as with the first embodiment. The correlation calculation may also be carried out between interference fringe images, on which the hologram images are based, instead of the hologram images. The accuracy in arithmetic operation is expected to improve in this case since the images for carrying out the correlation calculation are compressed into two-dimensional images.

Though the foregoing explanation relates to an example carrying out an optical correlation calculation, calculations may be carried out electronically with data being arranged on a memory of a computer. In this case, with computer holograms being generated by calculations, an arithmetic operation (e.g., correlation calculation) may be carried out between their images, so as to reduce the amount of arithmetic operations, thereby making it possible to perform high-speed arithmetic operations.

The data groups may be arranged on a surface of a virtual three-dimensional body having a predetermined characteristic or therewithin. When a correlation calculation between three-dimensional bodies is carried out by utilizing a characteristic of a virtual three-dimensional body, the amount of arithmetic operations can similarly be reduced, whereby high-speed arithmetic operations can be carried out.

INDUSTRIAL APPLICABILITY

The present invention is widely applicable to apparatus and methods which analyze various kinds of data such as statistical data and financial data in a multifaceted fashion.

The invention claimed is:

1. A method of performing parallel information processing between a plurality of information groups each comprising a plurality of information items, said method comprising the steps of:

three-dimensionally arranging a plurality of data items constituting data group information; and performing a data correlation calculation between a plurality of these three-dimensionally arranged information groups based on an arrangement characteristic thereof.

2. An information processing method according to claim 1, wherein said data group information is arranged as a hologram image; and wherein an image correlation calculation is carried out between hologram images.

3. An information processing system for processing information between a plurality of information groups each comprising a plurality of information items in parallel, said system comprising:

arranging means for three-dimensionally arranging a plurality of data items constituting data group information; and arithmetic means for performing a data correlation calculation between a plurality of these three-dimensionally arranged information groups based on an arrangement characteristic thereof.

4. An information processing system according to claim 3, wherein said arranging means arranges said data items as a predetermined hologram image; and wherein said arithmetic means carries out an image correlation calculation between a plurality of hologram images so as to perform said data correlation calculation.

5. An information processing system according to claim 4, wherein said arithmetic means projects a hologram image representing each data group and optically carries out said image correlation calculation.

6. An information processing system according to claim 4, further comprising hologram image preparing means for forming said predetermined hologram image.

* * * * *